United States Patent [19]

Little

[11] Patent Number: 5,004,379

[45] Date of Patent: Apr. 2, 1991

[54] THREADING INSERT

[76] Inventor: Roger W. Little, 11015 4½ St., Santa Fe, Tex. 77510

[21] Appl. No.: 468,546

[22] Filed: Jan. 23, 1990

[51] Int. Cl.⁵ ............................................. B23P 15/28
[52] U.S. Cl. .................................... 407/113; 407/115; 407/116; 407/117
[58] Field of Search ................ 407/113, 114, 115, 116, 407/117

[56] References Cited

U.S. PATENT DOCUMENTS 3,613,197 10/1971 Stier ..................................... 407/113
4,169,690 10/1979 Kendra ................................ 407/113

FOREIGN PATENT DOCUMENTS 2522735 4/1975 Fed. Rep. of Germany ...... 407/113

Primary Examiner—Frederick R. Schmidt
Assistant Examiner—Lawrence Cruz
Attorney, Agent, or Firm—Arthur Freilich; Robert D. Hornbaker; Leon D. Rosen

[57] ABSTRACT

A threading insert is provided of a type that includes a mount portion and a plurality of arms radiating therefrom that each forms a pair of cutting edges, which is rugged, facilitates accurate positioning of the insert on the tool holder, encourages reliable breaking of cutting chips, and enables internal threading in a small diameter hole. One insert includes four arms (34–40, FIG. 3) radiating from a mount portion (24), with each arm having a radially outer edge (52) and a pair of opposite sides (54, 56), and forming a cutting edge (58, 60) at the interception of each side with an end of the outer edge. The mount portion has four flat locating surfaces (42–48) lying at the sides of an imaginary square, with each locating surface lying between a pair of arms and with there being an obtuse angle (D) between each locating surface and an adjacent side of an arm. The side of each arm extends only a short radial distance before intersecting a flat locating surface, which results in rapid breaking of chips and there being a considerable distance between a central hole in the insert and each locating surface to avoid insert breakage. Each arm outer edge subtends an angle of no more than about 30°.

7 Claims, 5 Drawing Sheets

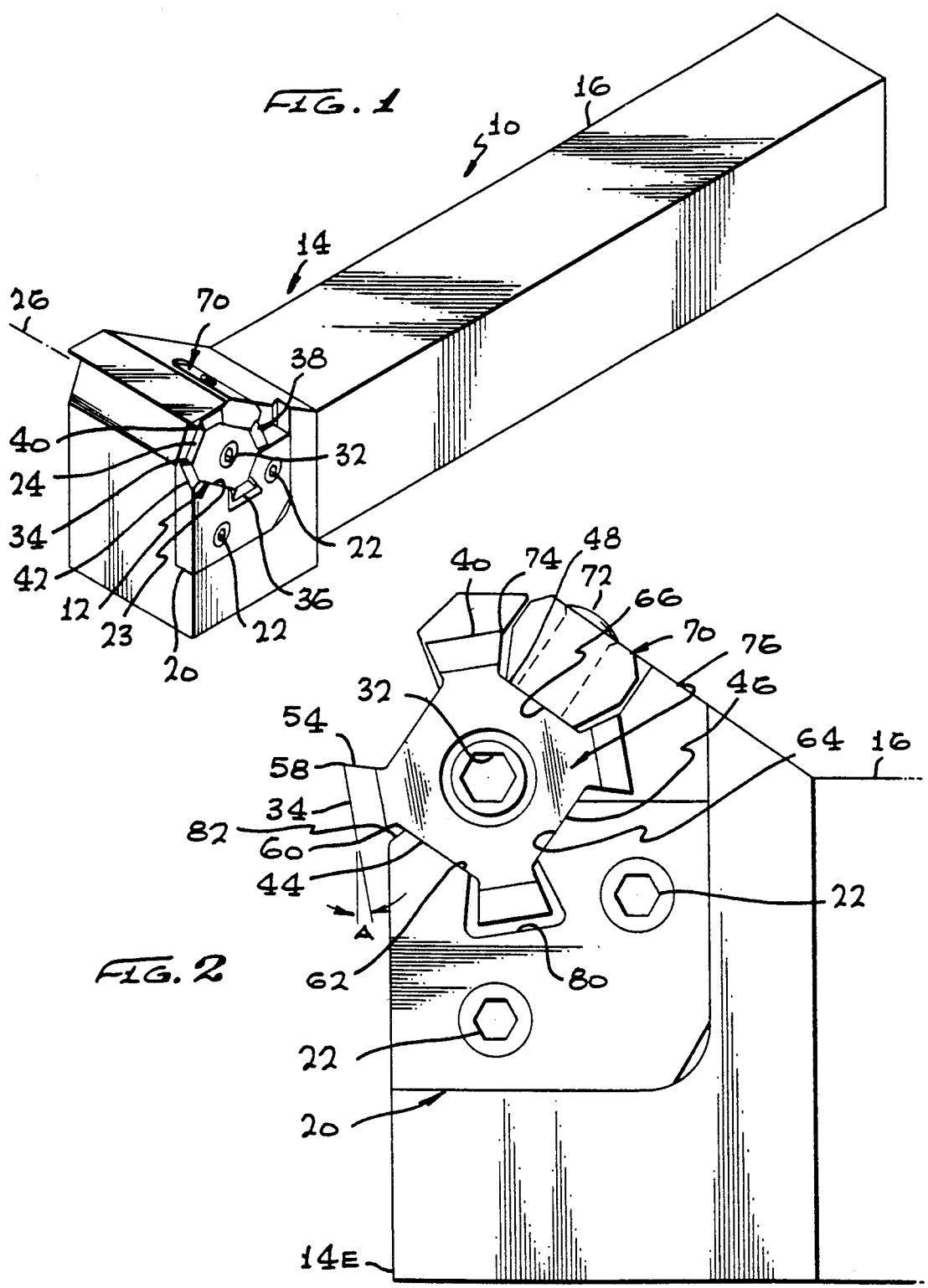

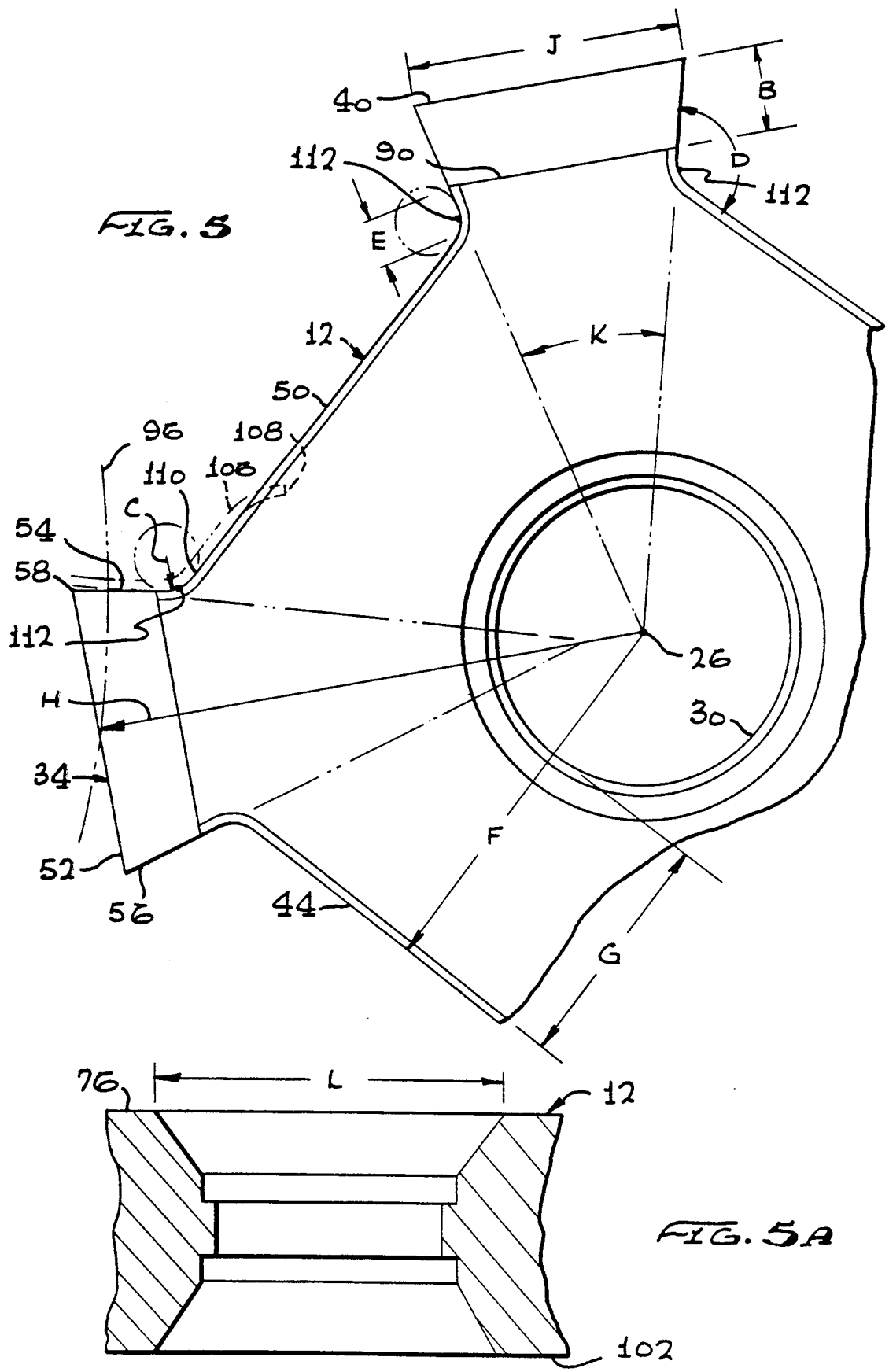

THREADING INSERT

BACKGROUND OF THE INVENTION

High quality threads are commonly cut in a workpiece mounted on a lathe, by a threading insert that is held in a tool holder. The cutting edge of the insert has a limited life, such as 50 threads per cutting edge, and the life of the insert is increased by constructing it with multiple cutting edges. When a cutting edge wears out, the insert is removed and reinstalled with a new cutting edge in position, it being highly desirable that the new cutting edge lie precisely in the same position as the old edge, despite the change in insert position. The manufacturing cost for an insert is about the same no matter how many cutting edges it has, so it is desirable that each insert have as many cutting edges as possible. However, any insert, to be practical, has to allow rapid and highly precise reinstallation of the insert to present a new cutting edge, with the insert and the tool holder being of simple and rugged design. It is also desirable if the insert can be used to cut an internal thread in a hole of small diameter, as well as an external thread.

Stier U.S Pat. No. 3,613,197, describes a threading insert with eight cutting edges. His insert includes a mount portion with a screw-receiving hole for mounting on a tool holder, and four arms radiating from the mount portion, with each arm having two cutting edges. However, he precisely locates his insert on a tool holder by using locating surfaces along the opposite sides of each arm. As a result, the sides of his arms are long, resulting in only a small thickness of metal between the innermost locations on his arms and the central hole of the insert, Also, the chips generated during cutting ride along a long flat surface into a narrow area, resulting in "balling" up of the chips. A threading insert which provided many cutting edges, which was of sturdy construction and could be precisely mounted on a tool holder of simple construction, would be of considerable value.

SUMMARY OF THE INVENTION

In accordance with one embodiment of the present invention, a threading insert is provided which has multiple cutting edges in a construction that is strong and that enables precise holding on a relatively low cost tool holder. The insert has a mount portion with a through hole lying on its axis for receiving a fastener that holds the insert to a tool holder, and has a plurality of arms radiating from the mount portion. Each arm has a radially outer edge and has opposite sides. Each corner where an arm side meets an end of the outer edge, forms a cutting edge. The mount portion forms a flat locating surface at the periphery of the insert, with each flat locating surface lying between a pair of arms. In an insert with four arms, the flat locating surfaces lie on the surfaces of an imaginary square. The intersection between each flat locating surface and an arm side is preferably closely spaced from an adjacent cutting edge and forms an obtuse angle. The arms are preferably relatively narrow, with the outer edges of all arms subtending a total angle not more than about one third of a circle, or 120°. A tool holder that supports the insert with the insert positioned so a first cutting edge of one arm machines a workpiece, preferably leaves the other cutting edge of that arm unsupported.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a threading tool, which includes a threading insert of the present invention mounted on a tool holder of the present invention.

FIG. 2 is a side elevation view of the threading tool of FIG. 1.

FIG. 5 is an enlarged partial side view of the insert of FIG. 3.

FIG. 5A is an enlarged sectional view of the insert of FIG. 4.

DESCRIPTION OF THE PREFERRED EMBODIMENT

Figure 3:
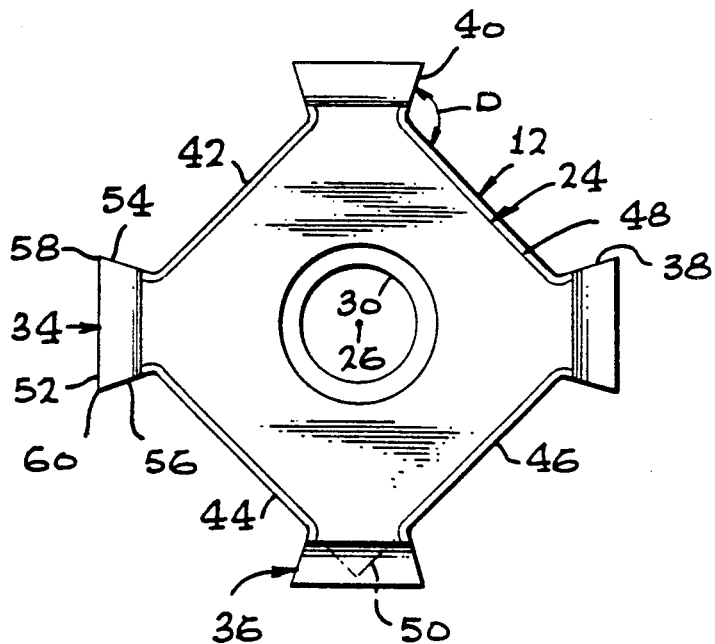
FIG. 3 is a side elevation view of the insert of FIG. 2.

FIG. 1 illustrates a threading tool apparatus or tool 10 which includes a threading insert 12 mounted on a tool holder 14. The tool holder includes a bar 16 and a replaceable pocket wedge 20 that is mounted by bolts 22 on the bar and which has a recess 23 that receives the insert 12 and that supports it. The threading insert includes a mount portion 24 with an axis 26 and with a through hole 30 lying on the axis. A fastener 32 such as an Allen screw passes through the hole and is threadably joined to a hole in the tool holder 14. The insert also has arms 34–40 that radiate from the mount portion 24 of the insert and which form cutting edges 42. The cutting edges 42 are all formed to cut threads in a workpiece.

As shown in FIG. 3, the mount portion 24 of the insert forms four flat locating surfaces 42-48 at the periphery of the insert, with each locating surface such as 44 lying between a pair of arms 34, 36. The locating surfaces 42-48 lie on the sides of an imaginary square 50 (a polygon with four equal sides). Each arm such as 34 has a radially outer edge 52 and has first and second opposite sides 54, 56. The outer edge 52 has opposite ends and forms a first cutting edge 58 at the intersection of the first side 54 and the outer edge, and a second cutting edge 60 at the intersection of the second side 56 and the outer edge. Thus, the insert forms eight cutting edges that are useful for cutting a thread in a workpiece.

As shown in FIG. 2, the insert is mounted on the wedge 20 of the tool holder, with a cutting edge 58 projecting from a tool holder end 14E to cut a thread. The cutting edge 58 of arm 34 is uppermost and the opposite cutting edge 60 is lowermost. Normally, the first or upper side 54 is oriented horizontally, so that an extension of it passes through the axis of rotation of the workpiece which is held in a lathe. The outer edge 34 (or at least the portion immediately under the cutting edge) extends at an angle A of about 12-15° from the vertical, to provide a clearance angle that is necessary for efficient machining. The insert is located at a precise location on the wedge 20 of the tool holder by two flat positioning surfaces 62, 64 of the wedge that engage corresponding flat locating surfaces 44, 46 on the mount portion of the insert. Another positioning surface 66 is formed on a clamp 70 which can be operated to press the locating surface 48 on the insert against the opposite positioning surface 62 on the wedge, as by turning a clamp tightening screw 72. The tool holder holds the insert at a helix angle of 1.5° (depending on the relationship of thread pitch to workpiece diameter) to insure that the insert form is parallel to the helical thread.

When the cutting edge 58 of the insert becomes worn, the fastener 32 is removed and the clamp 70 loosened, to allow the insert to be removed. The insert is reinstalled with a cutting edge such as 74 of another arm 40 positioned where the cutting edge 58 of arm 34 was previously located. After four cutting edges have been worn, the next time the insert is removed it is flipped over so that its face 76 that previously faced away from the tool holder, now lies adjacent to the tool holder, so that four additional edges such as 60 can be used.

Whenever the insert is removed and reinstalled, it is important that the new cutting edge such as 74 lie in precisely the same position as the previous cutting edge such as 58. This allows precision threading to proceed without having to adjust the position of the tool holder 14. The insert is sufficiently precise to allow a new cutting edge to lie within 0.0005 inch of the preceding one, which minimizes down time on CNC equipment. The insert 12 is formed with high precision, as by pressing particles of a hard material such as silicon carbide into a die and later sintering it. The wedge 20 is constructed with its two positioning surfaces 62, 64 lying precisely perpendicular to one another.

The insert 12 is installed on the wedge 20 by positioning the insert so two of its locating surfaces such as 44, 46 lie against the positioning surfaces 62, 64. The clamp 70 is then tightened. It is not necessary that the clamp positioning surface 66 be precise, as its only function is to press the insert against the positioning surface 62. After the insert is clamped, the fastener 32 is tightened. It may be noted that it is not necessary to clamp the insert against the locating surface 64, as forces encountered during threading keep the insert pressed against the positioning surface 46. It is noted that the wedge has a cutout 80 for receiving one of the insert arms, without making contact with either the outer edge or either side of the arm.

The wedge 20 has only two precision surfaces, these being the positioning surfaces 62 and 64. These surfaces are easy to machine because they are both flat and precisely perpendicular to one another. For the same reason, it is easy to check the position of these surfaces, as by holding a machine square to them. The pocket wedge is a replaceable item, that is replaced by loosening the wedge bolts 22. After replacement of a wedge, the machine controls that are used to position the threading tool may have to be readjusted and measured.

It is also common to not use a replacement pocket wedge, but instead to machine the bar 16 to directly hold the insert. It may be noted that with a working upper cutting edge at 58, the opposite or lower edge 60 of the arm is left unsupported, by leaving a space 82 below it. Applicant finds that such support is very seldom necessary, and by avoiding such support applicant avoids the need to provide a precision surface to intimately engage the lower side of the arm 34. Also, if there is very high pressure on the upper cutting edge 58 that will cause it to break, applicant prefers to allow it to break away to avoid damaging the workpiece or toolholder wedge, rather than to support the arm to prevent breaking away.

Figure 4:
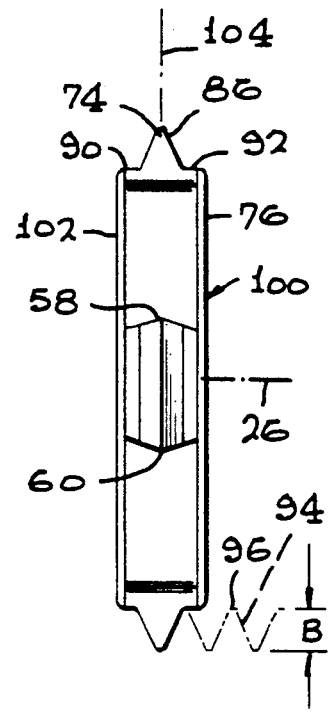
FIG. 4 is an end view of the insert of FIG. 3.

As shown in FIG. 4, each cutting edge such as 74 generally has a largely V-shaped tapered outer part 86 (except when cutting square threads or the like). The largely V-shaped part generally has sides tapered at an included angle of 60° and has a flat or rounded crest to form threads with a flat root (American National Thread) or rounded root (Unified Thread). The cutting edge has a pair of finishing sides 90, 92 at the radially inner end of the tapered part. Thus, the cutting edges of this insert are useful for cutting a thread 94 in a workpiece 96, where the thread has a predetermined depth B. The insert is in the form of a plate 100 with opposite faces 76, 102, and is formed symmetrically about a central plane 104 of the plate.

FIG. 5 shows the insert 12 cutting a thread in a workpiece 96, with the cutting edge 58 having cut to about half the depth of the final thread. The cutting operation generates a chip 106 which passes along the upper side 54 of the arm and onto the flat locating surface 50, the chip breaking at about the point 108 and falling off the insert. The insert has a transition 110 where the arm side 54 merges with the locating surface 50, which is of a small radius of curvature C and which has a center or intersection at the point 112. The angle D between a side of the arm and an adjacent flat surface is preferably more than 90° in order to prevent the chip from curling up and creating a ball of chips at the intersection. However, the angle D is preferably less than 180° to cause curvature in the chip so as to stress it and cause early breakage of the chip. The distance E between a finishing side 90 and the intersection 112 is preferably small, preferably less than the height B of the thread. As a result, the locating surface 50 is long and lies a considerable distance F from the axis 26 of the insert. For a center hole 30 of the insert of predetermined diameter (to hold a fastener of sufficient strength) this long distance F results in the insert having a considerable thickness G between the hole 30 and an adjacent locating surface such as 44, which minimizes the possibility of cracking of the insert. Also, the long locating surface facilitates secure positioning of the insert to resist turning due to the forces encountered during thread cutting. The distance F is preferably more than half the distance H between the axis of the insert and an outer edge, such as 52.

The outer edge such as 40 of each arm preferably has a relatively small width J so it subtends a relatively small angle K. The angle K is preferably no more than about 30° (i.e. less than 10% more, or in other words less than 33°). This results in long locating surfaces 50 between the arms. Also, this allows the insert to be used for internal threading in a hole of relatively small size. The total angle subtended by all arms is preferably no more than about one third of a full circle. It can be seen that the opposite sides 54, 56 of an arm 34 diverge in a radially outward direction (away from axis 26).

One insert applicant has designed, of the type shown in FIGS. 1-5, has a width 2H of 0.745 inch, a plate thickness of 0.171 inch, and locating surfaces lying in a square having sides 2F of 0.460 inch. The angle K was equal to 28° and the width J of the outer edge of each arm was 0.190 inch. The radius C of each transition was 0.050 inch, and the distance E between a finishing side and the intersection 112 was about 0.050 inch. The outer diameter L of the hole 30 was 0.232 inch. These dimensions result in each locating surface such as 50 having a length between a pair of points 112, of about 0.28 inch, which is much greater than the length J of each outer edge, and which is more than twice the length (B plus E) of each arm side such as 54.

Figure 6:
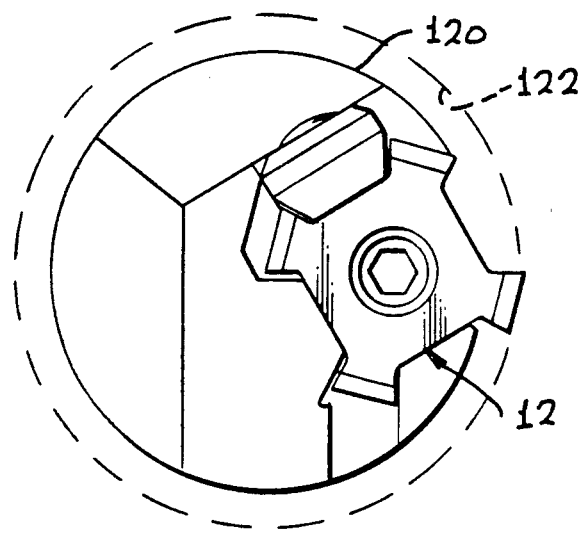
FIG. 6 is a side view of the insert of FIG. 3, shown mounted on an internal threading tool holder.
Figure 7:
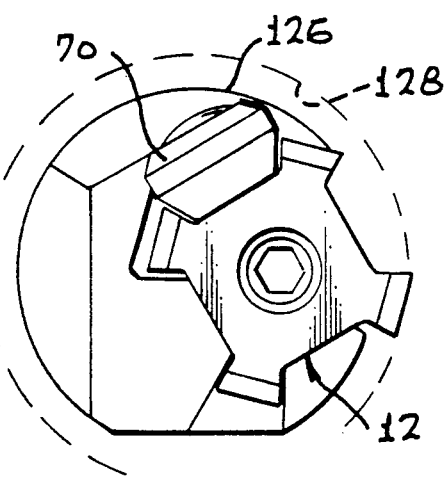
FIG. 7 is a view similar to that of FIG. 6, but showing the insert mounted on another internal threading tool holder which can be used for threading in bores of minimal diameter.

FIG. 6 illustrates the insert 12 being used on an internal tool holder 120 to cut a thread in a hole 122 in a workpiece. FIG. 7 illustrates the insert 12 on another internal tool holder 126 which is designed to enable the insert to be used to thread a smaller diameter hole 128.

Figure 8:
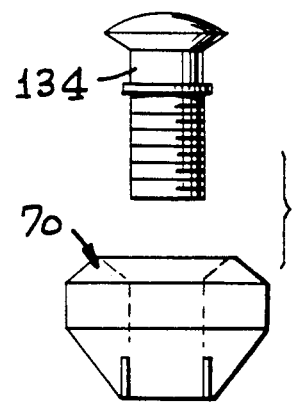
FIG. 8 is a side elevation view of the clamp of FIG. 2.
Figure 9:
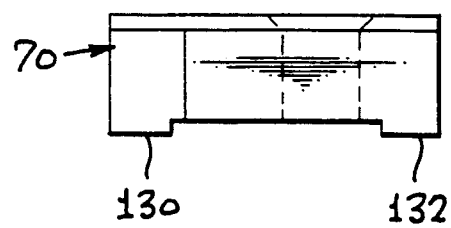
FIG. 9 is an end elevation view of the clamp of FIG. 8.
Figure 10:
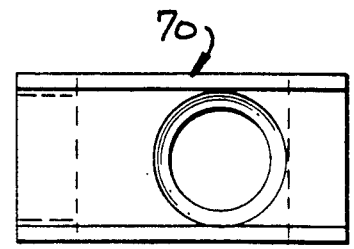
FIG. 10 is a top elevation view of the clamp of FIG. 9.

FIGS. 8-10 illustrate details of the clamp 70 which is used to clamp the insert in the tool holder of FIGS. 1, 6, or 7. One end 130 of the clamp presses down against a locating surface on the insert, the opposite end 132 presses down against the tool holder and a screw 134 screws the clamp down to the tool holder.

Figure 4A:
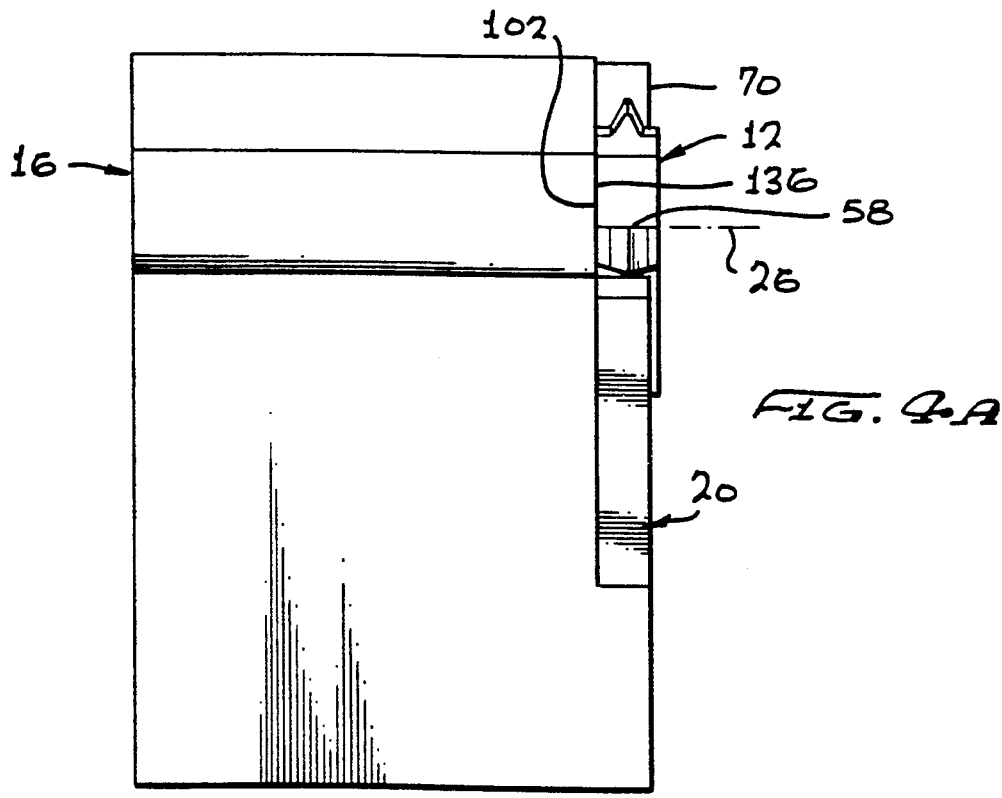
FIG. 4A is an end view of the threading tool and insert of FIG. 1.

As shown in FIG. 4A, the wedge 20 is slightly thinner than the insert 12. The insert face 102 presses against a flat face 136 of the bar 16. The bar surface 136 is angled by about 1½° to 2½° from the vertical to follow the helix of a thread. Applicant mounts about forty wedge blanks in the vise of a milling machine, machines the cutouts 80 of all wedges in the stack, and then precision grinds the positioning surfaces 62, 64 of all forty blanks in a stack. The grinding wheel is dressed, and then grinds both surfaces 62, 64 at the same time, with the projecting corner of the grinding wheel lying in the cutout 80.

Figure 11:
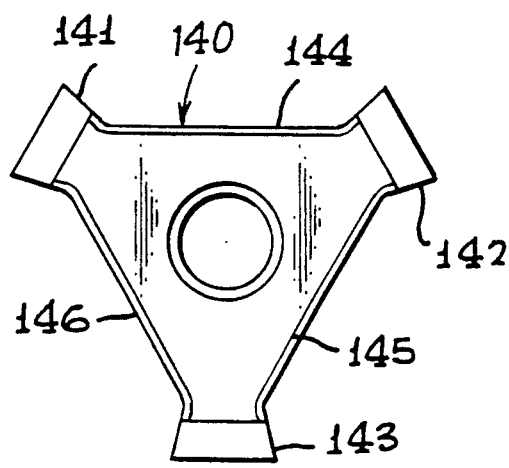
FIG. 11 is a side elevation view of a threading insert constructed in accordance with another embodiment of the invention.

FIG. 11 illustrates another insert 140 which uses the same general approach as for the insert of FIG. 3, except that the insert 140 has only three arms 141-143 to provide six cutting edges for threading. The insert 140 has three locating surfaces 144-146 lying on a regular (equal sides) polygon with three sides.

Figure 12:
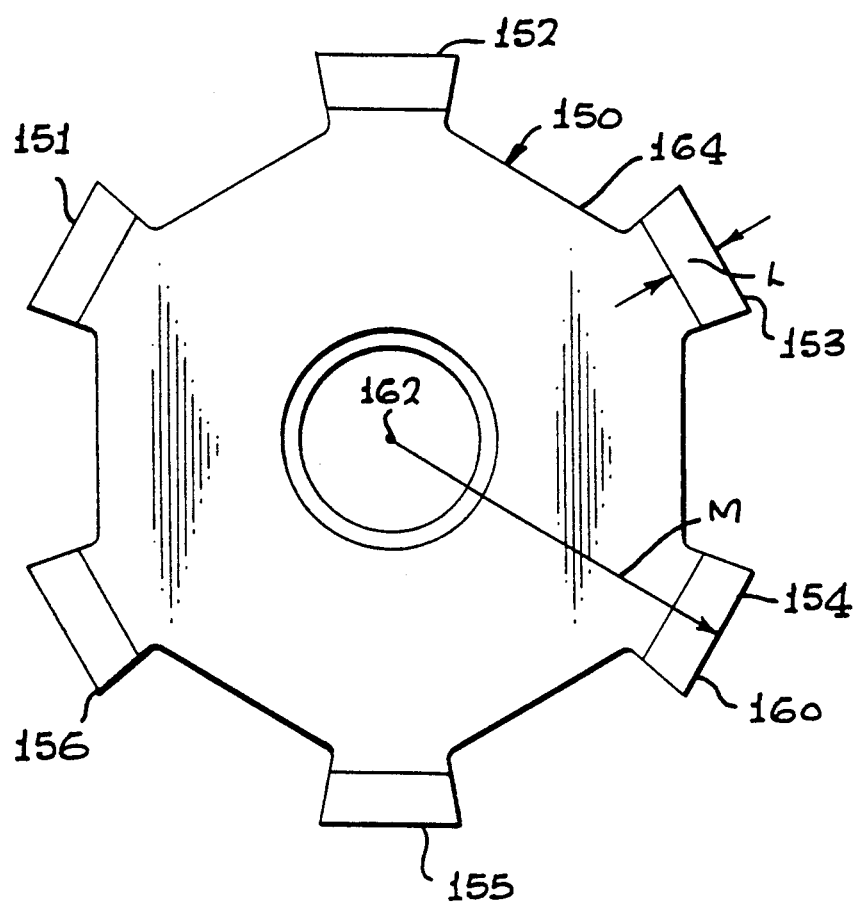
FIG. 12 is a side elevation view of a threading insert constructed in accordance with another embodiment of the invention.

FIG. 12 illustrates another insert 150 which has six arms 151-156 resulting in twelve cutting edges useful for threading. The ratio of the height L of each cutting edge to the distance M between each outer edge 160 and the axis 162 of the insert, is approximately the same as for the insert of FIG. 5. The six arms subtend an angle of one third of a circle, resulting in each outer edge 160 being shorter. This results in less material of the insert under each cutting edge, so that the setup is not as rigid as an insert with fewer arms. There are six precision flat locating surfaces 164 that each extend between a pair of adjacent arms. The surfaces lie on the sides of an imaginary six-sided regular polygon.

Thus, the invention provides a threading insert having numerous cutting edges, and which can be mounted with high precision in a tool holder of low cost. The insert includes a mount portion having a plurality of flat sides lying on the sides of an imaginary polygon with sides of equal length, and arms radiating outwardly from the corners of the polygon. Each arm has an outer edge and opposite sides, and forms a cutting edge at the intersection of each arm side with the outer edge. The intersection of each arm side with a flat locating surface, lies close to the cutting edge and there is an obtuse angle between each arm side and an adjacent flat locating surface. The total angle occupied by all arms is preferably no more than about one third of a full circle. The tool holder locates the insert on at least two of the flat locating surfaces, and does not support a side of an arm.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A threading apparatus comprising:
an insert having a mount portion with at least three straight insert locating sides lying on the sides of an imaginary regular polygon, said insert having a radially outwardly extending arm at each of the corners of said imaginary polygon, with each arm having an outer edge and a pair of opposite sides that extend in a largely radially outward direction from the axis of said polygon, and with each arm forming a cutting edge at the intersection of the outer edge and each of the sides of the arm;
a tool holder having a recess that holds said insert, said recess having walls forming a plurality of straight holder positioning surfaces that abut said insert location sides and having a clamp that presses said insert firmly at one of said insert location sides against positioning surfaces, whereby to accurately locate said insert.

2. The apparatus described in claim 1 wherein:
said tool holder has an outer end for lying adjacent to a workpiece to be threaded, with said recess extending to said outer end;
a first of said arms of said insert projects beyond said tool holder outer end, said first arm having an upper arm side forming a cutting edge for the workpiece to be threaded and a lower arm side, said tool holder being spaced from said lower arm side to leave said lower arm side unsupported.

3. The apparatus described in claim 1 wherein:
said tool holder includes a bar and a pocket wedge mounted on said bar, said wedge having a thickness about the same as the thickness of said insert and forming said positioning surfaces, and said bar forming a face, said insert having a face that lies against said bar face and having at least one fastener-receiving hole, and at least one fastener projecting through said hole and into said bar face.

4. The apparatus described in claim 1 wherein:
each of said cutting edges has an outer part of a radial length B of largely V-shaped cross-section for cutting a thread, and each of said cutting edges has opposite sides forming finishing surfaces at the radially inner parts of said cutting edge sides for finishing the tops of threads of a predetermined depth;
each of said straight insert locating sides intersects an arm side at a location spaced a radial distance E from the finishing surface of the corresponding arm;
the height B plus E of each arm is less than half the length of each straight insert locating side.

5. A threading apparatus, comprising:
an insert largely in the form of a plate having a mount portion with four sides lying on the sides of an imaginary square having an axis, said sides forming locating sides, said insert having four arms projecting radially outwardly at the corners of said imaginary square, each arm having an outer edge and opposite arm sides and forming a cutting edge at the intersection of each arm side and said outer edge;

a tool holder which includes a pair of precisely perpendicular flat positioning surfaces constructed to bear against a pair of said insert locating sides, and a cutout for receiving one of said arms, said tool holder including a clamp lying opposite one of said positioning surfaces and moveable against an insert locating side to press another insert locating side against said opposite positioning surface.

6. The apparatus described in claim 5 wherein:

said plate has opposite faces;

each of said cutting edges has an outer part of largely V-shaped cross-section for cutting a thread, each of said cutting edges has opposite sides with finishing surfaces extending substantially perpendicular to said faces of said plate for finishing the tops of threads of a predetermined depth;

the length B plus E of each arm in a direction radial to said axis, is less than half the length of each insert locating surface.

7. A threading insert apparatus comprising:

an insert having a mount portion with at least three locating sides lying on the sides of an imaginary regular polygon that has an axis, said insert having a radially outwardly extending arm at each of the corners of said imaginary polygon, with each arm having an outer edge and a pair of opposite arm sides that diverge in a radially outward direction from the axis of said polygon;

the length of each of said locating sides is more than 50% greater than the length of each of said arm opposite sides.

* * * * *

UNITED STATES PATENT AND TRADEMARK OFFICE
CERTIFICATE OF CORRECTION

PATENT NO. : 5,004,379
DATED : April 2, 1991
INVENTOR(S) : Roger W. Little

It is certified that error appears in the above-identified patent and that said Letters Patent is hereby corrected as shown below:

Column 6, line 28, after "location sides"

insert a comma --,--

Signed and Sealed this

Twenty-second Day of September, 1992

Attest:

DOUGLAS B. COMER

Attesting Officer     Acting Commissioner of Patents and Trademarks